No. 870,659. PATENTED NOV. 12, 1907.
H. ACKERMANN.
VALVE FOR PUMPS, COMPRESSORS, AND THE LIKE.
APPLICATION FILED NOV. 9, 1906.

Witnesses:
Paul Wollenberg
Emil Kayser

Inventor
Hugo Ackermann
Attorney

UNITED STATES PATENT OFFICE.

HUGO ACKERMANN, OF BERLIN, GERMANY.

VALVE FOR PUMPS, COMPRESSORS, AND THE LIKE.

No. 870,659.　　　　　　　Specification of Letters Patent.　　　　Patented Nov. 12, 1907.

Application filed November 9, 1906. Serial No. 342,720.

*To all whom it may concern:*

Be it known that I, HUGO ACKERMANN, a subject of the King of Prussia, German Emperor, and resident of 7 Milastrasse, Berlin, Kingdom of Prussia, German Empire, have invented certain new and useful Improvements in Valves for Pumps, Compressors, and the Like, of which the following is an exact specification.

My invention relates to organs for cutting off blowers, compressors, pumps and the like. To high-speed machines of this type high requirements are put. Guidances producing friction or jamming are to be avoided if possible and the mass of the valve parts moved must be limited to a minimum scale depending on the strength of the structure. Both these requirements are fulfilled by the known linked valve of Hoerbinger. However this valve shows, when opened or shut off, a turning or displacing of the valve flap as the links may be arranged. This movement of the valve flap gives rise to considerable drawbacks, for the rotation or displacement of the valve-disk takes place normally to the useful stroke enlarging thereby the path described at each valve play without any profit. Now the present invention tends to avoid this latter drawback and notwithstanding to fulfil the above mentioned two requirements. This is obtained by the employment of laminated springs radially arranged and rigidly secured with both their ends to the valve disk while they are held fast in their middle by the valve seat.

It will be sufficient to arrange two springs of such type to insure the intended centrical guidance. In using one spring only the valve disk would be caused to tilt. The employment of more than two springs is allowed, but it comes into consideration only in valves having large diameters.

Figure 1:
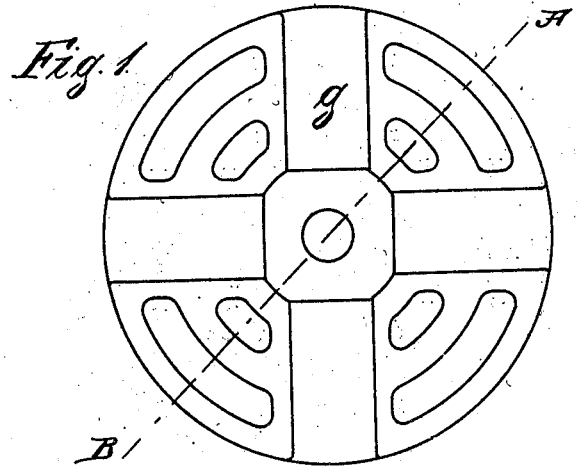
Figure 2:
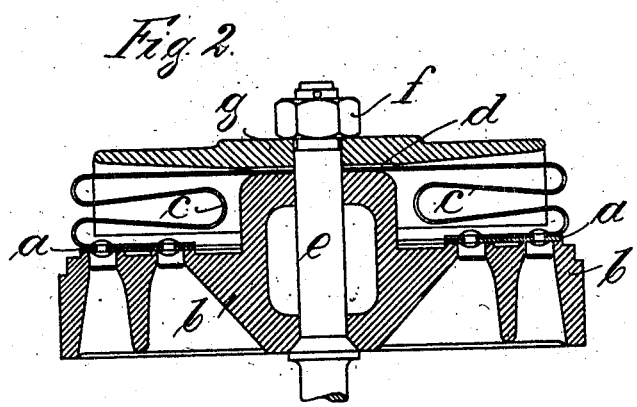
Figure 3:
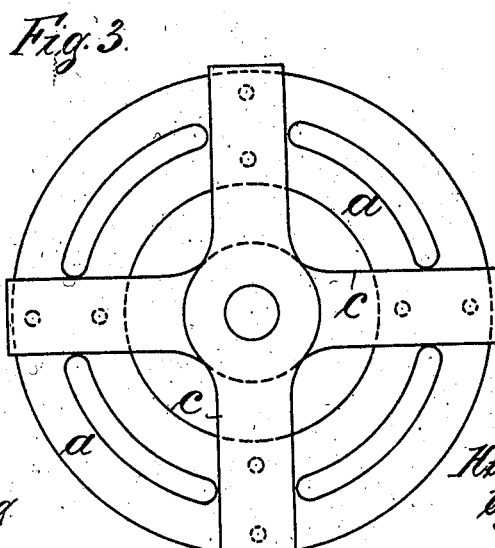

In order to make my invention more clear, I refer to the accompanying drawings, in which:

Figure 1 is a view of my improved valve taken from above, Fig. 2 is a vertical cross section of the valve on line A—B of Fig. 1, Fig. 3 is a view similar to Fig. 1 having the covering of the valve removed.

*a* is the valve disk and *b* the seat for the valve disk *a*. The valve seat *b* has a projection *b'* and is bored to leave passing for the valve spindle *e*.

*c* designates the laminated springs being curved as shown in the drawings and rigidly secured to or bolted with the valve disk *a* at their ends. In their middle the springs bear on the projection *b'* and are held fast thereon by the screw *f*.

*g* is a covering surrounding the springs and serving as a washer for the screw *f*. This valve works as follows:—

If the valve disk is lifted, the ends of the spring tend to move radially outwards, however the ends are hindered from effecting this movement by the springs being attached to the valve disk *a*. The forces caused by this intended movement are normally directed towards the valve axis and act at the ends of the laminated spring. Owing to the fact of being equal, but having opposite directions the two forces neutralize each other. The second spring *a* and any further spring will behave in the same manner.

It will be understood from the foregoing statements that except the spring forces acting in the direction of the valve axis, that is in the direction of the useful stroke, a number of radial forces occur only, the resultant of which is zero. As all forces pass through one point, that is the section-point of the springs, the formation of couples of forces which could cause a rotation of the valve disk, will be avoided. Therefore the valve disk will precisely be opened centrically and closed in same manner without any additional movement.

As seen in Fig. 2 the springs show a multiple curvature, which has the purpose of keeping low the strain occurring in the spring owing to the suppression of the above mentioned radial movement.

Having thus fully described the nature of my said invention, what I desire to secure by Letters Patent of the United States is:—

1. A valve for compressors, pumps and the like, comprising in combination: a valve disk, a valve-seat coöperating with said valve-disk, radially arranged laminated springs, rigidly secured to the valve disk at their ends and having a multiple curvature and a valve spindle for holding fast the laminated springs on the valve-seat.

2. A valve for compressors, pumps and the like, comprising in combination: a valve disk, a valve-seat coöperating with said valve-disk and having a projection, radially arranged laminated springs, rigidly secured to the valve-disk at their ends and having a multiple curvature, a valve-spindle and a screw thereupon for holding fast the springs on said projection of the valve seat, and a covering surrounding the springs and serving as a washer for said screw.

In witness whereof I have hereunto set my hand in the presence of two witnesses.

HUGO ACKERMANN.

Witnesses:
　HENRY HASPER,
　WALDEMAR HAUPT.